United States Patent [19]

Gentric et al.

[11] Patent Number: 4,463,235
[45] Date of Patent: Jul. 31, 1984

[54] SWITCH WITH SEVERAL LAYERS OF CROSSING POINTS

[76] Inventors: Alain Gentric, 27 Lotissement Keranroux, F-22300 Lannion; Michel Lahaussois, 1, rue Anatole le Bras, F-22560 Trebeurden, both of France

[21] Appl. No.: 251,201

[22] Filed: Apr. 6, 1981

[30] Foreign Application Priority Data

Apr. 15, 1980 [FR] France ................. 80 08935

[51] Int. Cl.³ .......................................... H01H 63/00
[52] U.S. Cl. .................................................. 200/175
[58] Field of Search ......................... 200/175–180; 361/351, 352

[56] References Cited

U.S. PATENT DOCUMENTS 3,225,322  12/1965  Reel ................................. 361/352
3,349,361  10/1967  Cartelli ..................... 361/352 X
3,666,902  5/1972  Owen et al. ................. 200/175 X

FOREIGN PATENT DOCUMENTS

1457726  11/1966  France .

Primary Examiner—J. R. Scott
Attorney, Agent, or Firm—Laff, Whitesel, Conte & Saret

[57] ABSTRACT

A mechanical cross point switching matrix has orthogonally related vertical and horizontal conductive elements or wires. Plugs are rotatably mounted at each of the crosspoints. A conductive surface on the plugs electrically interconnects the multiples at that crosspoint when the plug is rotated in one direction, and disconnects the multiples when the plug is rotated in the opposite direction. The invention packs the plugs into a smaller space to increase the switching capacity relative to the space requirement, as compared to the prior art. In part, this reduction in space requirement is accomplished by inverting adjacent plugs, relative to each other so that the plug operators may be fitted into spaces at opposite sides of the multiples.

13 Claims, 20 Drawing Figures

SWITCH WITH SEVERAL LAYERS OF CROSSING POINTS

BACKGROUND

The present invention relates to a matrix-type switch with several layers of crossing points which is especially usable in telephone switching or other signal distributor systems, or in similar devices. More particularly, the invention relates to such a switch with selection being made by coordinates.

The switch described in European Patent Application No. 80401188.0 (U.S. patent application Ser. No. 174,790, filed Aug. 4, 1980, and its continuation Ser. No. 379,058, filed May 17, 1982) is formed of several first layers of parallel wires, oriented in a first direction, and of several second layers of parallel wires oriented in a direction perpendicular to the first layers, the first and the second layers of wires being intercalated relative to one another. Each layer of wires is supported by or within a grid of insulating material having a square mesh. Each mesh opening has a conductor wire running through it, the wire being parallel to one of the sides of the mesh opening.

The grids of the second layers (i.e. even numbered grids) are angularly shifted by one quarter of a rotation, all in the same direction, relative to the position of the grids of the firt (i.e. odd numbered grids) layers (i.e. the wires of the odd and even numbers are orthogonally related). One crossing point is constituted by two superposed adjacent meshes and a conductor surface of a plug, the axis of which is perpendicular to the plane of the layers, and which is plugged into the meshes of the crossing point. The plug makes it possible electrically to connect the wire segment of the upper mesh to the wire segment of the lower mesh.

Each plug which is plugged into a pile of crossing points is fitted with as many conductor cylindrical rings as there are crossing points being superposed. Each ring has a height chosen to constitute the conductor surface of a single crossing point. In some cases, the conductor surfaces of the plugs are constituted only by ring sectors. The plugs comprise crescent-shaped heads, the horns or points of which cooperated with the flexible teeth of the selection bars which can be deformed by the teeth of the work bars.

The selection and work bars are crossed (i.e. they are perpendicular to each other). Each selection bar can be pushed in one direction thus determining, together with a working work bar, the rotation of a plug head by one quarter of a rotation in one direction. The selection bar can be pulled in the other direction, thus determining, with an adjacent work bar, the rotation of the same head by one quarter of a rotation in the other direction. The rotation of the plug in one direction or in the other direction causes the conductor sectors of the rings of the plug to set or to break the connections of the piled-up crossing points.

In the other case, the conductor surfaces of the rings are constituted by complete circular rings and the closing or the opening of the crossing points is obtained by longitudinally displacing the plugs in a direction perpendicular to the plane of the layers, either in one direction, or in the other.

Thus, in the switch described in European Patent No. 80401188.0, in each couple of grids required to form a crossing point, a plug is wedged or held by the two sides of the insulating superposed meshes. The plug is so held by the wire of a mesh which constitutes a third side, and by the perpendicular wire of the other mesh which constitutes the fourth side. The plug thus is held in place by two rigid sides and by two flexible sides. The space existing between the conductors and the sides of the adjacent meshes are wasted. As, in addition, the widths of the mesh sides are relatively more important than the widths of the conductor wires, the results of that arrangement is that, in a grid, more than half the useful surface is lost.

SUMMARY OF THE INVENTION

One object of the present invention is to provide for a switch with several layers of crossing points, similar to the one described in European Patent No. 80401188.0, but in which the space actually used is practically double that of the European Patent No. 80401188.0 switch.

Another object of the present invention is to provide for a switch in which the contact points of the plugs are in a position of equilibrium, whatever their state.

Another object of the invention is to provide for a switch in which the plugs have, relative to the step or pitch of the layers of wires, a diameter which is relatively larger than the diameter of the plug used in the switches described in the above-mentioned main (European) patent and the first certificate of addition.

Another object of the invention is to provide for a switch which makes it possible to execute folded matrices.

Another object of the present invention is to provide for a plug head having a structure, and for a governing member making it possible to group all of the plug heads at the top of the pile, that reduces the relative volume occupied by the governing device and thus increasing the possiblities of making a connection at the level of the openings.

Another object of the invention is to provide for a plug head governing member such that the accessibleness of the head is possible over a single face of the pile.

According to a characteristic of the invention, a switch has several layers of parallel wires oriented in a first direction, and several layers of parallel wires oriented in a direction perpendicular to the first one. The first and second layers are piled up in an intercalated manner. Each first layer is constituted by a plurality of row wires of uneven rank and by a plurality of row wires of even rank. Each second layer is formed by a plurality of column wires of uneven rank forming a first matrix and by a plurality of column wires of even rank forming a second matrix. First crossing points are formed by the row and column wires of the first matrix, and conductor surfaces on first plugs which are wedged between the row and column wires of the first matrix, and the row and column wires of the same rank of the second matrix. Second crossing points are formed by the row and column wires of the second matrix and conductor surfaces of second plugs which are wedged between the row and column wires of the second matrix and the row and column wires of the upper ranks of the first matrix. The first and second plugs having a diameter which is greater on the mesh side of thw wire layers. Each conductor area of a plug comprising a first and a second contact surface is galvanically connected together, the angular positions of the first and of the second contact surfaces being shifted by 90°, and their axial distances being equal to those of two adjacent types.

According to another characteristic of the invention, the cnductor surfaces present the shape of an "L" in which the base of the "L" corresponds to a 90° arc, and the height of the "L" corresponds to the distance between the layers in one direction and the layers in the other direction.

According to another characteristic, the first plugs have their heads at the top of the switch, and the second plugs have their heads at the bottom of the switch pile-up.

According to another characteristic, each layer of wires is placed, without any blocking, in grooves provided in the opposite sides of a frame of plastic material.

According to another characteristic, each frame is fitted with first slits on two opposite sides, which support the conductors or wires and with second slits on the two other opposite sides, the pile-up being constituted by frames alternately shifted by 90°, the second slits of an upper frame being positioned over the conductors or wires placed in the first slits of the lower adjacent frame.

According to another characteristic of the present invention, a switch has each plug head with a low cam-shaped part comprising two arcs of circles of different diameters joined by segments and surmounted by an upper part in the shape of a crank presenting a vertical indentation at its end. The indentation forms a gear surface for a vertical flexible finger carried by a governing rod of a switching member. The guiding module of the governing member has lug pieces against which one or the other of the cam segments and, or, one or the other side of the cranks come to hit.

According to another characteristic, the heads of all of the plugs are placed on a same side of the pile-up of crossing points.

According to another characteristic, the length of the cranks is greater than the side of the squares formed by the layers of wires, the large diameter of the cams is slightly smaller than the side of the squares.

According to another characteristic, the active end of each governing rod is flexible. It has, at the point of suspension of the vertical flexible finger, a stud which is engaged in a groove dug in a vertical wall of the switching member, the groove presenting a concave up-turned curvature. The rod is connected to means for translation displacement which cause the stud to follow the groove, in one direction or in the other, at each switching. The high points of the groove is at a level such that the low end of the finger will be above the cranks, while the low zone of the groove is at a level such that the low end engages the indentation of a crank.

According to another characteristic, a row of lug pieces out of two is eliminated. The switching member comprises two parallel governing rods.

BRIEF DESCRIPTION OF THE DRAWINGS

The above-indicated characteristics of the invention, as well as others, will appear more clearly upon reading of the following description of various embodiments. The description being given relative to the attached drawings, in which.

DETAILED DESCRIPTION OF SEVERAL EMBODIMENTS

Figure 1:
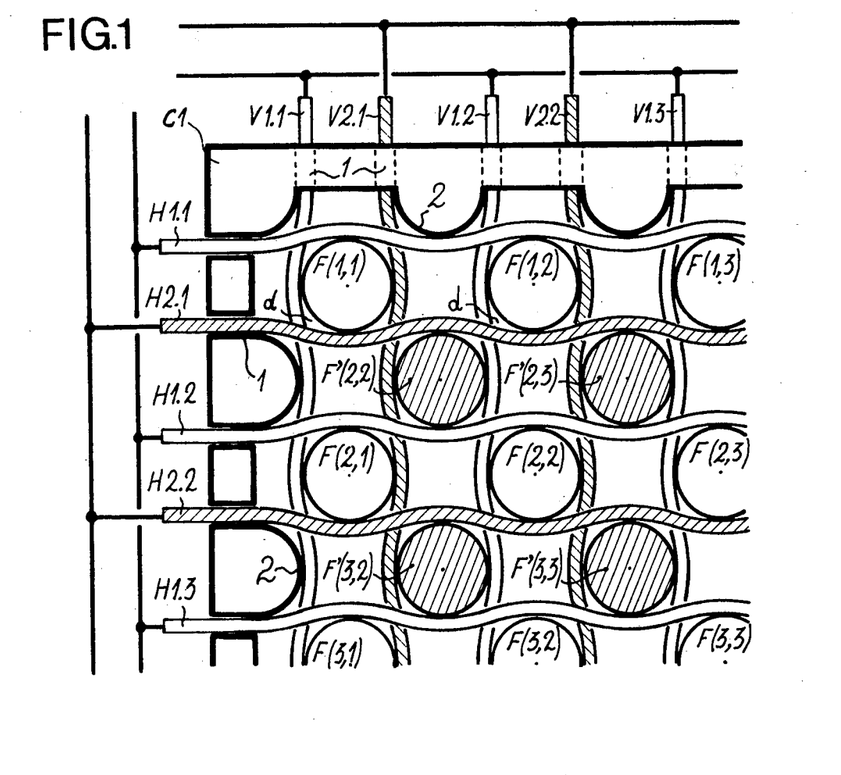
FIG. 1 is a schematic view from the top of a switch according to the present invention.

The switching element, partially represented in FIG. 1, comprises a first matrix of conductor wires formed by a layer of row wires H1.1, H1.2, etc., and by a layer of column wires V1.1, V1.2, etc., and a second matrix of conductor wires formed of a layer of row wires H2.1, H2.2, etc., and of a layer of column wires V2.1, V2.2, etc. Layers H1 and H2 of row wires are in the same horizontal plane, the wires of one layer being alternated with the wires of the other layer. Layers V1 and V2 of column wires also are in the same horizontal plane, but which is different from the plane of layers H1 and H2. The wires of layers V1 and V2 are also alternated. In practice, layers H1 and H2 are on one side of an insulating frame C1, while layers V1 and V2 are on the other side of the frame. The edges of frame C1 are fitted, on one side, with notches 1 which are parallel to layers H1 and H2. The ends of the wires H1, H2 of those layers are inserted into notches 1. On the other side, notches 1 are also parallel to receive the ends of the wires in layers V1 and V2. It must be noted that the wires are not blocked in notches 1. Between notches 1, the frames present inwardly turned swelling projections 2.

The first and the second matrices of conductor wires are formed together in a matrix of squares d (H1.p.H2.q;V1.r.V2.s) in which H1.p, H2.q, V1.r and V2.s are the references of the wires forming the square. In practice, p and q can differ only by one unit, and the same is true for r and s.

Squares d for which p and q are equal, as are r and s, are fitted with plugs F (p, r). Squares d for which q is less than p and s is less than r. Squares d are fitted with plugs F'(p, r). Thus, FIG. 1 shows the plug F(1.1) in the square formed by the wires H1.1, H2.1, V1.1 and V2.1; plug F(1, 2) in the square formed by the wires H1.1, H2.1, V1.2 and V2.2; plug F(2, 1) in the square formed by the wires H1.2, H2.2, V1.1 and V2.1; plug F(2, 2) in the square formed by the wires H1.2, H2.2, V1.2; and V2.2, etc. In the same manner, Plug F'(2, 2) is shown in the square defined by the wires H1.2, H2.1, V1.2 and V2.1; plug F'(3, 2) in the square defined by the wires H1.3, H2.2, V1.2 and V2.1, etc. Some of these plugs and wires are crosshatched in FIG. 1, for easy identification (e.g. plug F'(2, 2) and wire H2.1 are so crosshatched).

Figure 2:
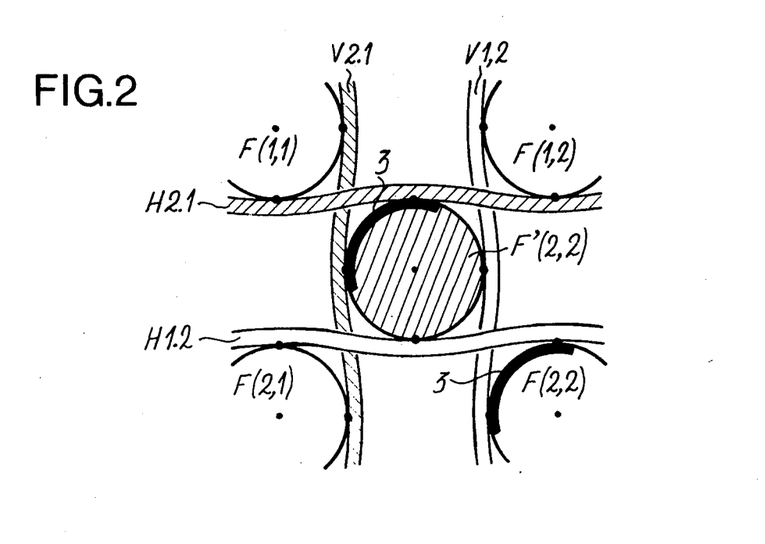
FIG. 2 is a schematic view of a crossing point of the switch in FIG. 1, in a larger scale.

As an example, as shown in FIG. 2, plug F'(2, 2) is essentially the same as the other plugs. A conductor area or surface 3 has a diameter hwich is slightly greater than the side of the square in which it is lodged, that is to say, a diameter which is greater than one-half of the step or pitch of a layer of wires. Therefore, it deforms the square to have somewhat rounded sides, as also do the four plugs F(1, 1), F(1, 2), F(2, 1) and F(2, 2) which are adjacent to it. As plugs F and the plugs F' are arranged in a quincuncial manner, each wire is alternately bent arcuately in one direction and in the other. It must be noted that swelling projections 2, which form semicircles toward the inside, play the part of plugs for the wires which are adjacent to the edges of the frame (i.e. projections 2 bend the wires arcuately).

It must be noted that there is thus obtained a uniform distribution of the contact pressures between the surfaces of the plugs and the conductor wires. When the plug is rotated inside its square in order to set or to brake electric continuities, the distribution of the pressures is not modified.

Several layers of row and column wires can be superposed. There results from that, that the cylinder of each plug is interwoven with four, eight, twelve, sixteen or more bent wires or beams, depending on the number of layers. That structure makes it possible to absorb the possible size deviations which may affect the diameters of the plugs, on the four arrows or more. Thus, variations in plug size do not disturb the functioning of the adjacent plugs.

In addition, it appears that the elements of the switch reach a state of auto-equilibrium only at the contacts of the conductor wires and of the plugs.

Figure 3A:
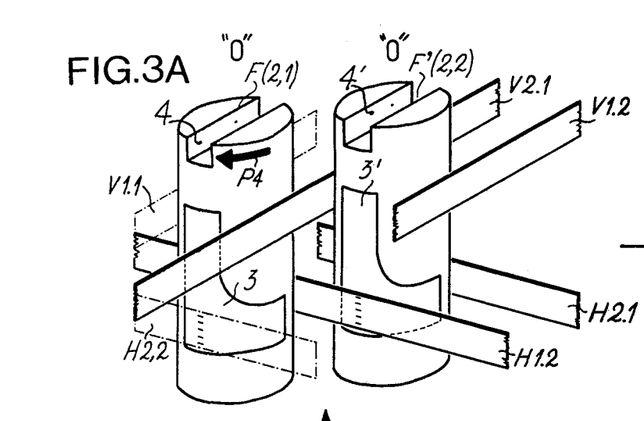
FIGS. 3A to 3D are schematic views which illustrate the operation of the switch in FIG. 1.

FIG. 3A represents the two adjacent plugs F(2, 1) and F'(2, 2), as well as the conductors H2.1, H1.2, H2.2, V1.1, V2.1 and V1.2 which are interwoven with them. Plug F(2, 1) comprises a conductor surface 3 shaped like an "L", the upper part of the "L" being at the level of the column conductors while the bottom of the "L" is at the level of the row conductors. The height of a surface, therefore, is approximately equal to the difference of level between the upper edge of the column conductors and the lower edge of the row conductors. The length of the "L's" foot is on the order of one quarter the circumference of the plug. In the position indicated in FIG. 3A, plug F(2, 1) is in its rest position or state "0". Indeed, surface 3 is in contact with conductor H2.2, but it is insulated from conductors V1.1 and V2.1. No current can pass through plug F(2, 1).

Plug F(2, 2) also comprises a conductor surface 3', which is identical with area 3 and located at the same level. In the position indicated in FIG. 3A, plug F'(2, 2) also is in its position of rest or state "0". Area or surface 3' is in contact with conductor H1.2, but it is insulated from conductors V2.1 and V2.2. No current can pass through plug F'(2, 2).

FIGS. 3A to 3D represent slits 4 and 4' at the top of the plugs. Those slits schematically represent a means to cause the plugs to rotate, as by means of a screwdriver. Of course, in a practical embodiment, the heads of the plugs have a more elaborate shape, which makes it possible to rotate them by means of switching members.

Figure 3B:
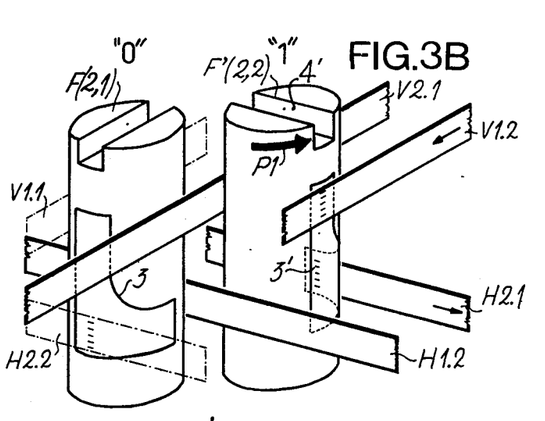

In FIG. 3B, it is assumed that plug F'(2, 2) has been rotated in the counter-clockwise direction, by one quarter of a rotation, as indicated by arrow P1. The position of plug F(2, 1) has not been modified. Surface 3' of plug F(2, 2) now has its upper part in contact with conductor H2.1, thus establishing an electric circuit between vertical V1.2 horizontal H2.1, conductive segment through 3'. The crossing point is closed. Plug F'(2, 2) is closed or at work or in state "1", while plug F(2, 1) still is open and in state "0".

Figure 3C:
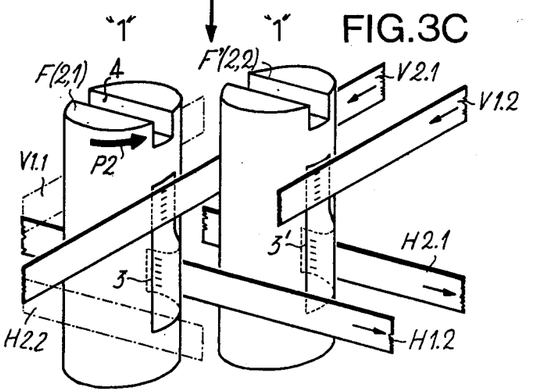

In FIG. 3C, it has been assumed that plug F(2, 1) has been rotated in a counter-clockwise direction, by one-quarter of a rotation, as indicated by arrow P2. The position of plug F'(2, 2) remains as represented in FIG. 3B. Surface 3 of plug F (2, 1) now has its upper part in contact with vertical conductor V2.1, and its lower part is in contact with horizontal conductor H1.2, thus establishing an electric circuit between vertical V2.1 and horizontal H1.2, through conductive segment 3. The crossing point now is closed. Plug F(2, 1) is closed or working or it is in state "1", as is plug F'(2, 2).

Figure 3D:
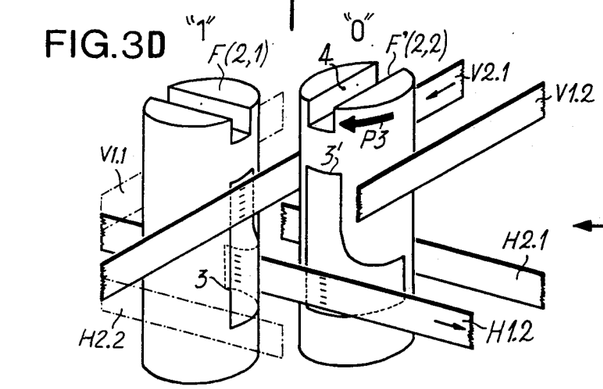

In FIG. 3D, it has been assumed that plug F'(2, 2) has been rotated in a clockwise direction, by one-quarter of a rotation, as indicated by arrow P3. The position of plug F(2, 1) has not been modified relative to that in FIG. 3C. Therefore, plug F'(2, 2) has taken back the position it had in FIG. 3A. That is to say, it has come back to state "0", plug F(2, 1) remaining in the open or state "1".

In order to cause plug F(2, 1) to open or change to state "0", it is sufficient, as indicated by arrow P4 in FIG. 3A, to rotate it by one-quarter of a rotation in a clockwise direction.

The switchings which have just been described relative to FIGS. 3A to 3D indicate that there is no interaction between the plugs having reference markings F and those having reference markings F'.

Figure 4:
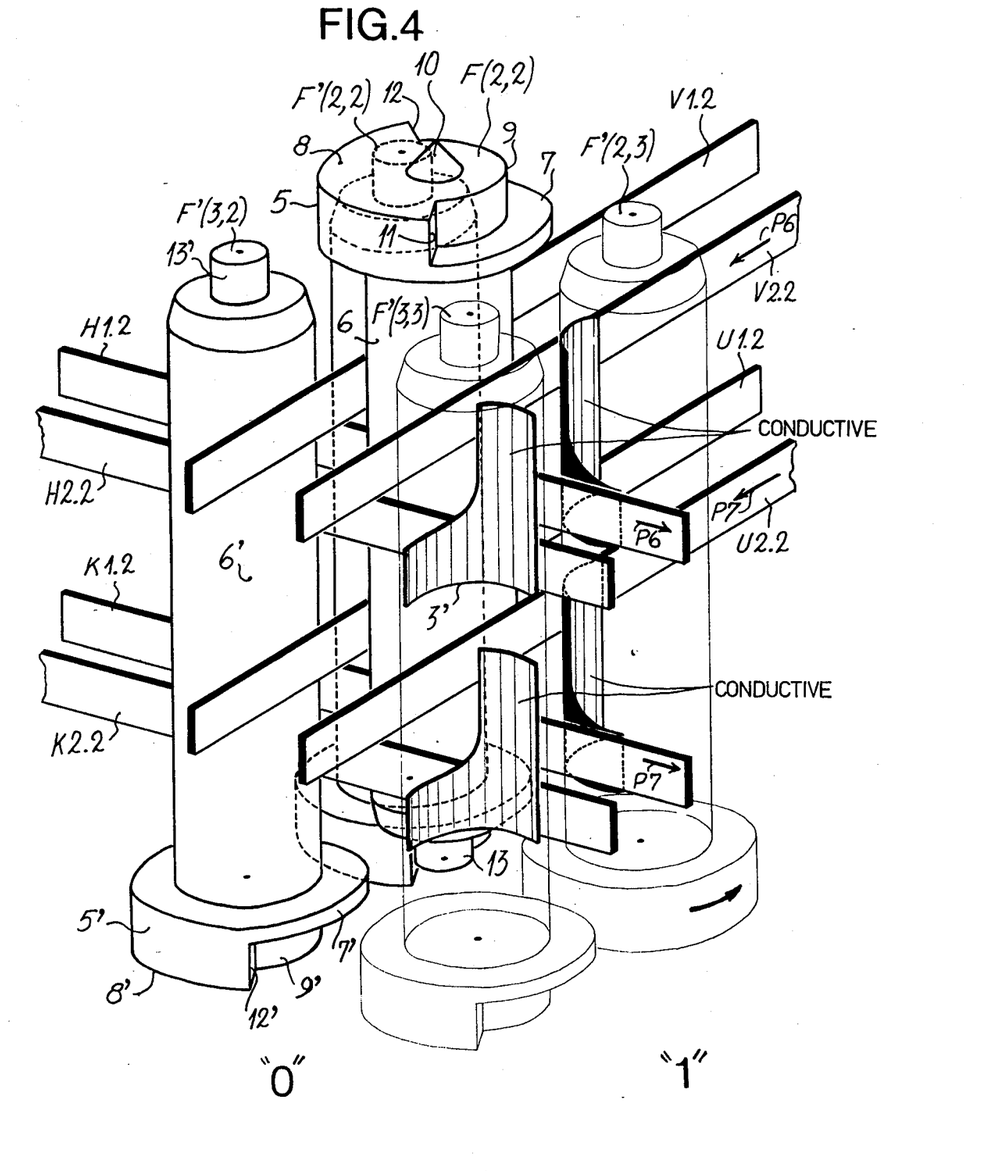
FIG. 4 is a schematic view, in perspective, of a group of plugs used in the switch in FIG. 1.

The perspective view in FIG. 4 shows, as an example, the four plugs F'(2, 2), F'(2, 3), F'(3, 2) and F'(3, 3) the governing heads 5' of which are at the bottom, and plug F(2, 2) the governing head 5 of which is at the top. Also represented are some of the conductors of the two layers with which those plugs can close contacts, that is to say, for the upper layer, horizontal conductors H1.2, H2.2, vertical conductors V1.2 and V2.2 and, for the lower layer, horizontal conductors K1.2, K2.2, and vertical conductors U1.2 and U2.2. The operation of the lower level cross points are deduced from the operation of the first first level by simple translation.

Plug F(2, 2) comprises a cylindrical body 6 fitted with a head 5, the entire complex 5, 6 being made of an insulating plastic material. Body 6 is fitted with a number of small contact segments 3 which are equal to the number of the layers of the switch. These small contact segments 3 are in the shape of an "L", as already described relative to FIGS. 3A to 3D.

Head 5 comprises a cylindrical lower part 7 and an upper part in the form of a circular sector 8, which presents a cylindrical swelling 9 in its center. The center of the cylindrical swelling 9 has, above it, a small knob or pion 10 in the form of a cone. Of course, the body 6 of the plug, the cylinder of 7, member 9 and cone 10 rotate around the same axis. The sectorial part 8 is limited by planes 11 and 12 which together form an angle at the center slightly less than 180°.

Plug head 5 is used with a switching member of the type of that described in the Application for the First Certificate of Addition, indicated above.

At the opposite end of head 5, stem or body 6 ends with a coaxial cylindrical projection 13, the diameter of which is definitely less than the diameter of said body.

All of the plugs bearing reference marking F are identical to plug F(2, 2), which has just been described. Plugs having reference marking F' have their bodies 6' and their small contact segments 3' which can be deduced from the translation of body 6 and of small segments 3. Heads 5' can be deduced from heads 5 by symmetry, relative to the median plane perpendicular to the axis of the plugs.

In FIG. 4, plugs F(2, 2), F'(2, 2), F'(3, 2) and F'(3, 3) are assumed to be in the open or "0" state, while plug F'(2, 3) is assumed to be in the closed or state "1". Therefore, plug F'(2, 3) presents a current passage from respectively vertical conductors V1.3 and U1.3 respectively to horizontal conductors H1.2 and K1.2, as indicated by arrows P6 and P7.

Figures 5, 6:
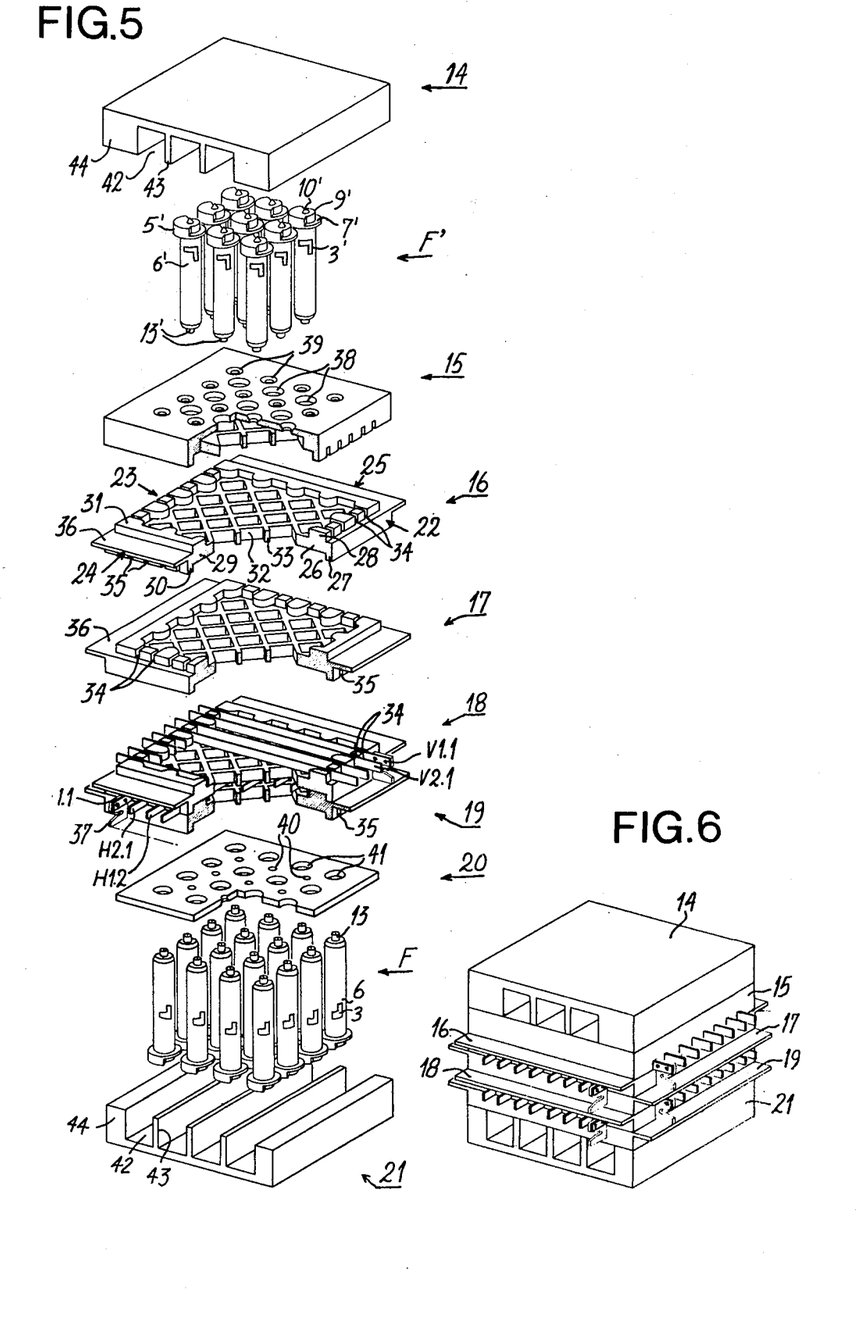
FIG. 5 is a perspective exploded view of a switching unit in which switches are used according to FIG. 1.
FIG. 6 is a perspective view of the unit in FIG. 5, with the various elements being fitted into one another.

FIG. 5 is an exploded view, partly in cross section, which schematically represents the elements of a pile-up of switches according to the invention, associated with the controls or governing elements. That complex comprises a governing module cover 14, a group of F' plugs, an upper panel 15, a first supporting grid 16, a second supporting grid 17, a third supporting grid 18 fitted into a fourth supporting grid, a lower panel 20, a group of F plugs, and a governing module cover 21.

Supporting grid 16 is formed by a rectangular frame comprising two parallel narrow sides 22 and 23, and two parallel wide sides 24 and 25. The wide and narrow sides are perpendicular to each other. The cross section of sides 22 and 23 presents the shape of a square, one horizontal arm 26 of which is relatively long and thick relative to the vertical arm 27. In addition, arm 26 carries an upwardly projecting part 28. The cross section of sides 24 and 25 also presents the form of a square, the horizontal arm 29 of which is identical to arm 26 and the vertical arm 30 of which is identical to arm 27. Arm 29 also carries an upwardly projecting part 31.

Arms 26 and 29 form an approximately square frame, the internal edges of which are joined by a series of equidistant bars 32, extending at 45°, and by a series of equidistant bars, extending at 135°. Bars 32 and 33 have a height equal to the thickness of arms 26 and 29; they are perpendicular to one another; they form the grid properly speaking into which plugs F and F' are pushed. The 45° rotation of the grid relative to the alignments of the plugs F and F' ensure the quincuncial arrangement represented in FIG. 1. The squares of the grid of bars 32 and 33 have a side, the length of which is slightly more than the diameter of the plug bodies, so that the plugs can be lodged into them with an appreciable play.

Arms 27 and 30 form, under arms 26 and 20, a ledge or rim, the height of which is equal to that of the projecting parts 28 and 31. Projecting parts 28 and 31 form an upwardly turned edge, while the edge formed by 27 and 30 is turned downwardly, the arrangement of those edges being such that the one formed by 27 and 30 fits around the one formed by 28 and 31. In addition, the upper edge formed by the projecting parts of sides 22 and 23 presents grooves 34, the pitch of which is that of the conductors of the switch. The upper edge formed by the parts projecting from sides 24 and 25 does not present any grooves. The lower edge formed by arms 30 and 27 of sides 24 and 25 also comprises grooves 35, the pitch of which is that of the wires or conductors of the switch. The upper edge formed by arms 27 of sides 22 and 23 does not comprise any grooves.

Finally, edges 24 and 25 comprise horizontal edges 38, the upper face of which is lined up with that of arms 29 and the thickness of which is appreciably smaller than that of 29. Those edges 35 make it possible to separate the layers of external ends of the conductors or wires.

Grid 17 is identical to grid 16, but it is shifted by 90° relative to the latter. The angular shift is translated by alignments between grooves 35 of grid 17 and grooves 34 of grid 16, and so forth in the pile up.

The grid 18 is identical with grid 16 and is oriented with a few vertical wires V1.1, V2.1, V1.2 and V2.2 placed in the corresponding grooves 34. The median plane of vertical conductors V1.1 and V2.1 passes through the center of the corresponding squares formed by bars 32 and 33. The distance between verticals V1.1 and V2.1 is, as indicated relative to FIG. 1, slightly less than the diameter of the plugs body.

The representation of grids 18 and 19 also shows how the grids fit on top of each other, grid 19 being shifted by 90° relative to grid 18. It also shows the ends of the horizontal wires H1.1, H2.1, H1.2 and H2.2 fitted into grooves 35 of grid 18 and grooves 34 of grid 19. As an example, a terminal 37 is affixed to the end of horizontal conductor H1.1. The terminal 37 can be connected to the corresponding wire of a cable.

Panel 15 is a part which is practically the part of grid 16 that is located below the level of the upper edges of bars 32 and 33, minus edges 36. A square plate is pierced with a series of holes 38 and 39 and positioned over edge 36.

Holes 38 run through the plate to enable the bodies of plugs F' to pass therethrough. Holes 39 receive the cylindrical studs or projections 13 of plugs F.

Panel 20 is a simple square plate inscribed inside the perimeter formed by edge 27-30 of grid 19, immediately above it. It comprises series of holes 40 and 41. Holes 40 receive the cylindrical studs or projections of plugs F' and holes 40 to receive plugs F.

Cover 14 comprises many grooves 42. The step or pitch of these grooves corresponds to the spacings of the plugs F', which are oriented in the same direction as the rows of F' plugs, or even in the direction of the horizontal conductors. The height of grooves 42 is equal to the height of a plug head, plus the height of a commutation or switching member. The bottom of partitions 43 define the grooves, as well as that of external walls 44, and come in contact with the upper face of panel 15. Partitions 43 run between the plugs.

Cover 21 is similar to cover 14, with grooves oriented in the same direction. However, in the described example, it comprises an additional groove because plugs F are more numerous than plugs F'.

FIG. 6 shows the whole assembly of the elements in FIG. 5, fitted into one another, plugs F and F' being set in place inside the assembly. The compactness of the whole assembly is such that there are about twice the number of crossing points, relative to the switches, as described in European Patent No. 80401188.0.

Of course, FIG. 5 shows a switch which comprises only two layers of crossing points for the sole purpose of simplifying the drawings. It should be understood that a switch would comprise, in practice, x layers of crossing points, x varying from 2 to 7 for applications to telecommunications.

Figure 7A:
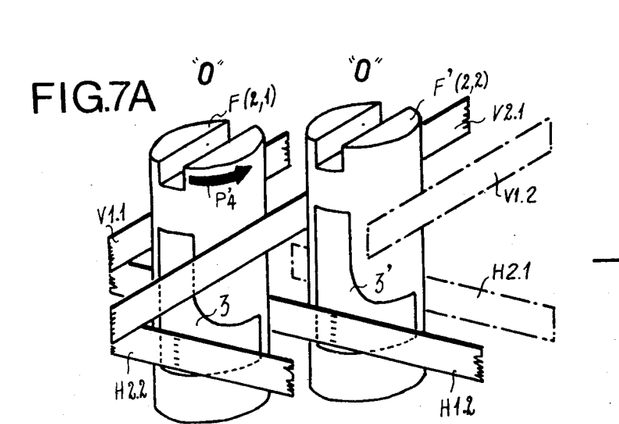
FIGS. 7A to 7D are schematic views which illustrate a variation of operation.
Figure 7B:
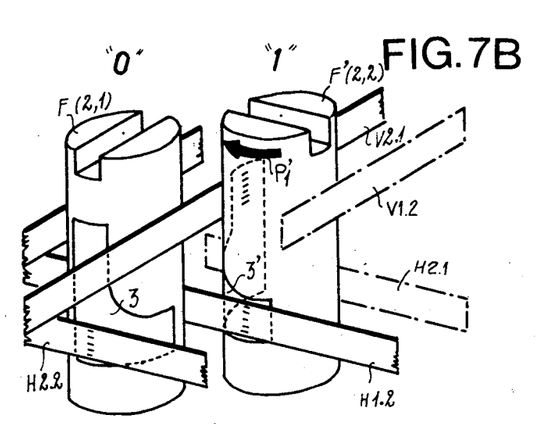
Figure 7C:
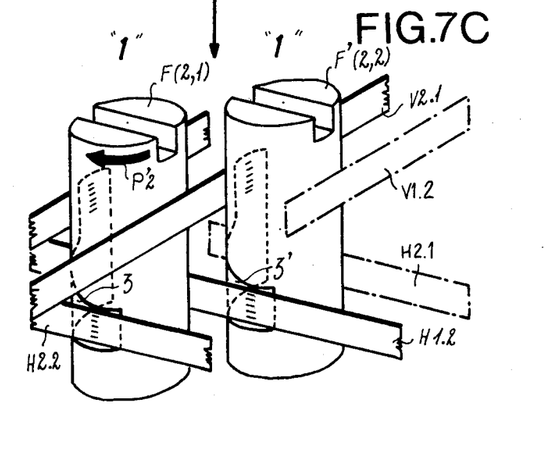
Figure 7D:
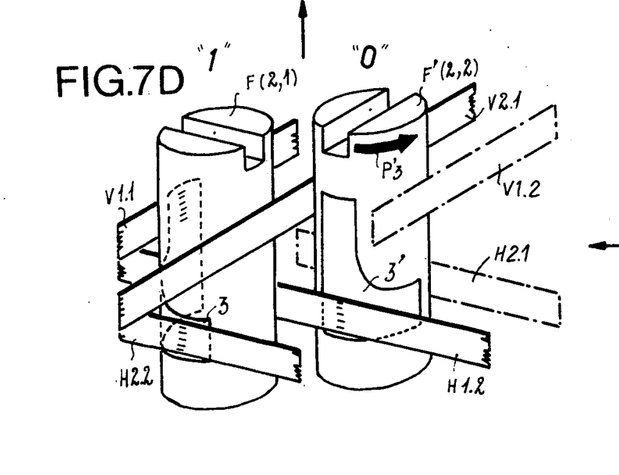

FIGS. 7A to 7D represent a variation in the governing device of the plugs, relative to the governing device described relative to FIGS. 3A to 3D. In FIG. 7A, both plugs (F(2, 1) and F'(2, 2) are in the open or "0" state. In FIG. 7B, plug F'(2, 2) has been rotated by one quarter of a turn in the direction of arrow P'2, which is the reverse of the direction of arrow P2 in FIG. 3B. It can be seen that arrow F'(2, 2) establishes an electric circuit between vertical V2.1 and horizontal H1.2, through conducting segment surface 3'. Plug F'(2, 2) has changed the closed or state "1". In FIG. 3C, plug F(2, 1) is rotated in the direction of arrow P'3, which is the reverse of the direction from arrow P3, FIG. 3C, thus causing plug F(2, 1) to change to the closed or state "1", etc. In that way, different switchings are obtained by causing the plugs to rotate in one direction or in the other, thus offering a remarkable flexibility of use.

Figure 8A:
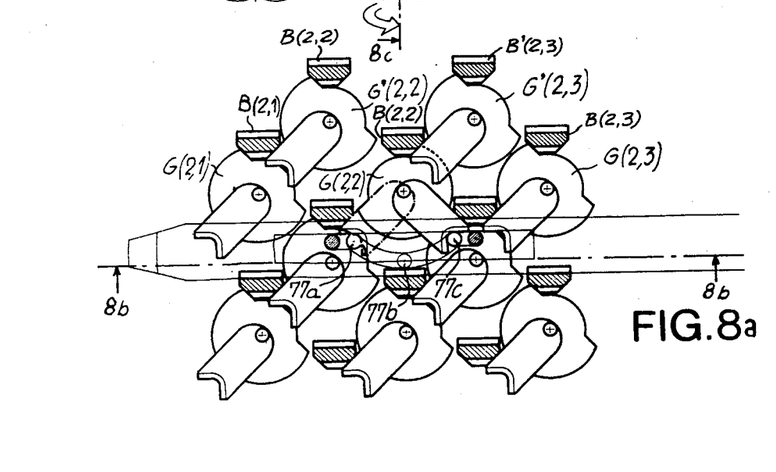
FIGS. 8A to 8C respectively are elevated, plane and end views of the active part of the switching governing member and of plug heads, according to the present invention.
Figure 8B:
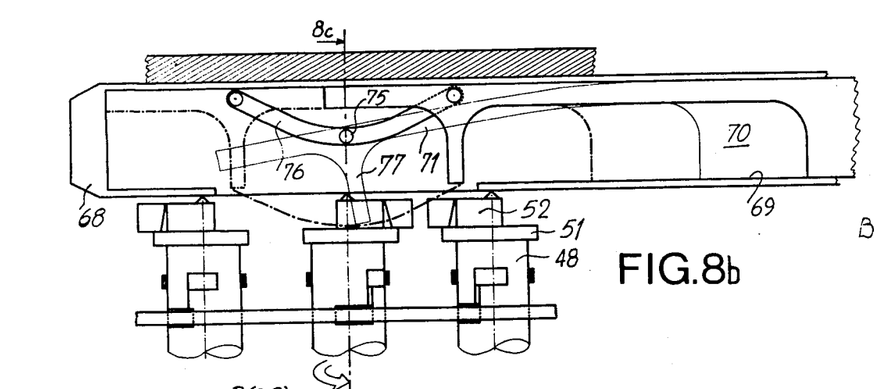
Figure 8C:
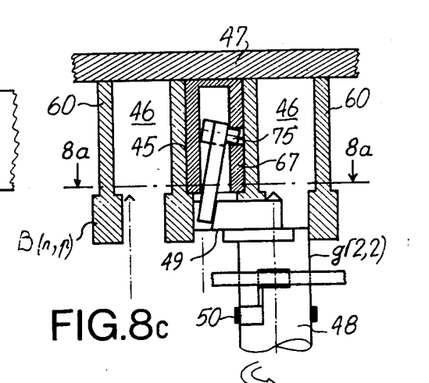

FIGS. 8A to 8C represent a switching member 45 which may be introduced into a groove 46 of a cover 47 to switch one of the plugs of the associated pile, that is, for example, plug G(2, 2). FIG. 8A is a section view taken along line 8a—8a in FIG. 8C; FIG. 8B is a section view taken along line 8b—8b in FIG. 8A; and FIG. 8C is a vertical section view taken along line 8c—8c in FIG. 8B.

Plug G(2, 2) comprises a cylindrical body 48, similar to body 6, fitted with a head 49 which is different from head 5. The entire complex 48 and 49 is made of an insulating plastic material. Body 48 is fitted with small contact blades or conductive segments 50, in a number equal to the number of layers of the switch. Those small blades or conductive segments 50 have a shape which is approximately that of an "S". As will be seen below, the plugs of FIG. 8 operate in the manner which is already described relative to FIGS. 3A to 3D.

Figure 10:
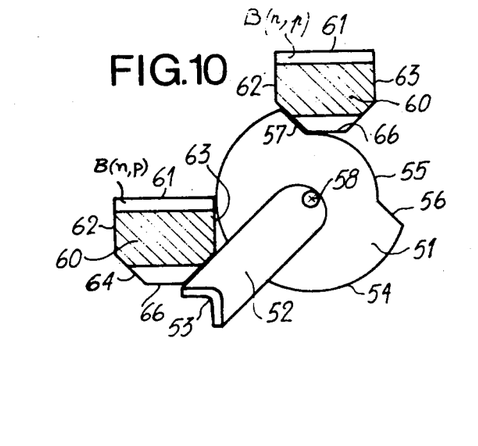
FIG. 10 is an enlarged view of the plug head and of two of the three lug pieces located in its immediate vicinity.

Head 49 of plug G(2, 2), FIG. 10, comprises a lower part 51, in the shape of a cam, and a higher part 52 in the form of a crank, which has a vertical cutout 53 at its end. Cam 51 is limited by the arc of a circle 54, the center angle of which is close to 240°. The diameter of arc 54 is larger than the diameter of arc 55. The arc of circle 55 has an angle at its center which is close to 120°. The faces of arcs 54 and 55 are joined by straight segment faces 56 and 57 which are aligned. Crank 52 is unitary with cam 51, and it has at its top a cone-shaped projection 58. Arcs 54, 55, body 48 and projection 58 have the same axis of revolution, axis 59.

Grooves 46 of cover 47 are defined by vertical partitions 60 which are either perforated or continuous. These partitions 60 are unitary on the upper plate of the cover. The lower free edges of each partition 60 have a series of lug pieces B(n, p), in which n and p correspond to the indices of the plug with which the lug piece is associated. The whole complex of lug pieces B(n, p), therefore, presents a quincuncial shape as does that the whole complex of plugs. The horizontal section of a lug piece (B(n, p) presents a six-sided polygonal shape having one long side 61 which is parallel to the direction of partitions 60, two equal sides 62 and 63 which are adjacent and perpendicular to 61, two oblique sides 64 and 65, respectively adjacent to sides 62 and 63, and a small side 66 which joins the ends of sides 64 and 65 and which is parallel to partitions 60. The distance between the sides 61 and 66 is greater than the thickness of partition 60. The difference in length is distributed on each side of the partition. The angles of sides 64 and 65 are such that, when head 49 is rotated in the other direction, the segment 57 comes to hit against side 65. In addition, the section of lug piece B(n, p) comprises an axis of symmetry which is perpendicular to section 60 and which runs through axis 59 of plug G(n, p).

Figure 9A:
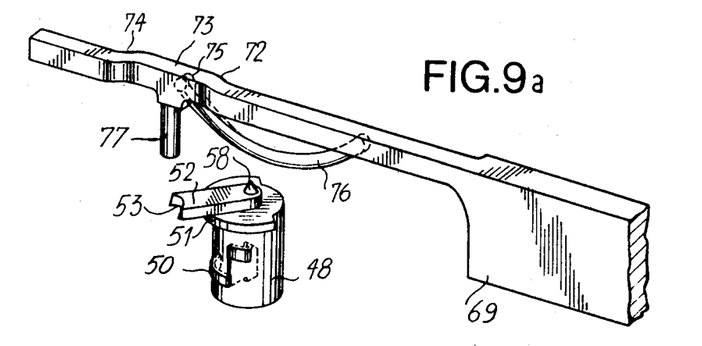
FIGS. 9A to 9C are schematic views which show the changes of state of a switching plug head.
Figure 9B:
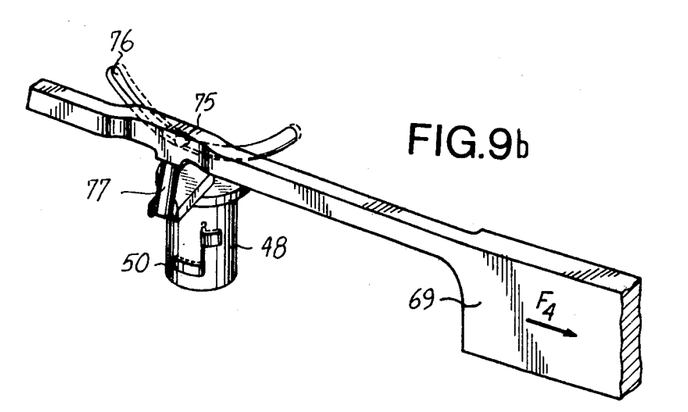
Figure 9C:
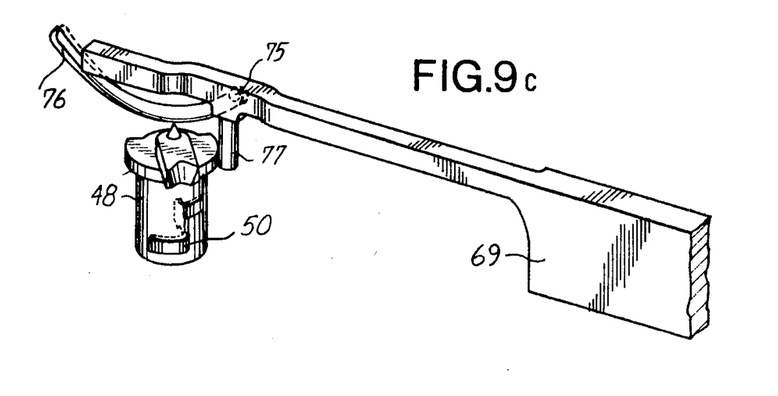

Switching member 45 is composed of a U-shaped profile 67, the U of which is downwardly turned and the width of which is equal to the width of a groove 46. The end 68 of the profile is bevelled to make it easier to the introduction of the member into a groove. In profile 67, a slide 69 of the body 70 is lodged to occupy the free space inside the U. Slide 69 ends with a flexible rod or stem 71, the section of which is definitely smaller. In the state of rest, slide 69 occupies an upper part of the volume defined by the U. As shown in FIGS. 9A to 9C, rod or stem 71 has an approximately square section; it presents, moving upwardly and seen from the top, a first elbow 72 bending to the right, then a straight part 73 and, finally, a second elbow 74 symmetrically bending to the left, as compared with the first elbow 72. On straight part 73, toward the outside, there is fixed a stud 75 which is engaged in a groove 76 of the corresponding lateral wall of profile 67 (FIG. 8C). Under the straight part 73 is set a relatively long and flexible finger 77. Groove 76 presents the shape of an arc of circle, the concave side of which is upwardly turned.

The length of finger 77 and the level of the high points of groove 76 are such that it is possible, when stud 75 is in one of the high points of groove 76, to move member 45 in a groove 46, without modifying the positions of the plug heads which are located under the end of finger 77. The low level (the level of the bottom) of the arc of groove 76 is such that, when slide 69 is moved relative to profile 67 (FIG. 8C), the end of finger 77 moves downwardly enough to engage in the vertical notch or cutout 53 of a crank 52.

FIG. 9A schematically shows the slide 69 beyond plug head G(2, 2). FIG. 9B shows the intermediary position of slide 69 during the switching, in the direction of arrow F4 of the head. Finger 77 has moved downwardly, it has engaged in cutout 53 and, therefore, has caused the head to rotate by 45°. In that position, rod or stem 71 is subjected to a torsion which can be seen in FIG. 8C, which represents that state. FIG. 9C shows the final position of the switching, in which stud 75 has gone up at the other end of groove 76. Finger 77 is again completely above the heads, this making possible the withdrawal of switching member 45 (FIG. 8C) from space 46.

In order to perform the switching in the direction which is opposite or reverse to the direction of arrow F4, there would be taken, as an initial position, that is represented in FIG. 5C and, as final position, that is represented in FIG. 9A. The intermediary position is still that shown in FIG. 9B.

FIG. 8A shows how the movements of the cranks and of the cams of the plug heads are limited by lug pieces B(n, p), each allowed plug rotation being over 90° in one direction or in the other, that rotation corresponding to the functioning in FIGS. 3A to 3D. It will be noted that in the course of the rotation of plug G(2, 2), its crank 52 passes above parts 51 of the neighboring heads (G'(3, 2) and G'(3, 3). In practice, the level of the lower plane of crank 52 can be slightly above the level of the upper plane of part 51. Thus, in the course of the rotation, there is no contact between the elements of the neighboring heads. The object of crank 52 is to lengthen the lever arm on which finger 77 acts, that is to say, to lessen the effort which must be supplied by the finger to rotate the plug.

FIG. 8B shows slide 69 in dash-dot lines, in the position represented in FIG. 9A. In fine line, FIG. 8B shows slide 69 in the position represented in FIG. 9B and, in heavy line, the position represented in FIG. 9C. The numerical references of the elements of the slide are indicated for only the fine line drawing. Especially, the plane view in FIG. 8B shows the different positions 77a, 77b and 77c of finger 77 at different stages of the switching.

It will also be noted, in FIG. 8A, that in their rest position, the plug heads have two bearing surfaces, one by an edge of cam 51, the other by an edge of crank 52, on two lug pieces B(n, p). In one embodiment, one row out of two of lug pieces B(n, p) is eliminated, in that case, we have two shifted rows of plug heads. At rest, for one row of plug heads, the bearing surface is located between one edge of crank arm 52 and one lug piece and, for the other row, between a cam edge and a lug piece. It is then possible to use a switching member, the width of which is approximately double that of member 45, and which contains two slides respectively allocated to the one and to the other row of plug heads.

FIGS. 9A to 9C also show an embodiment of a contact 50 which, instead of having the already described "L" shape, presents the "S" shape. The upper part of the "S" can come in contact with the conductor (vertical, for example) of the layer located at the lowest level and the conductor which is perpendicular (horizontal, in this example) to the conductors of the first layer. The intermediary part of the "S" (i.e. the vertical part of element 50) extends between the zones of contact, properly speaking of the "S", is radially fitted into the body of the plug.

We claim:

1. A multi-layer mechanical crosspoint switch wherein each of said layers comprising a first plurality of spaced parallel wires oriented in a first direction, and a second plurality of spaced parallel wires oriented in a second direction which is substantially perpendicular to the first direction, the first and second layers being piled up one upon the other in an intercalated manner, a frame of insulating material individually associated with each of said layers for supporting each of the wires in said associated layers whereby a cross point is constituted by intersection wires located in neighboring layers, each first layer of said wires being constituted by a plurality of row wires of uneven ranks and a plurality of row wires of even ranks, each second layer of said wires being constituted by a plurality of column wires of uneven ranks and by a plurality of column wires of even ranks, the row wires and the column wires of uneven ranks forming a first matrix, and the row wires and column wires of even ranks forming a second matrix, and rotatable plug means extending perpendicularly through said wires at each of said cross points, a conductor surface on each of said plugs having height of a conductive surface which is sufficient to electrically connect a segment of a wire in one layer to a corresponding segment of the perpendicular wire in a neighboring layer, first cross points being formed by the row and column wires of the first matrix, means responsive to a rotation of first of said plug means in said first matrix for presenting the conductive surfaces of said first of said plugs which extend through said wires and between said row and column wires of the first matrix and the row and column wires of the second matrix, second cross points being constituted by the row and column wires of the second matrix, means responsive to a rotation of second of said plug means in said second matrix for presenting the conductive surfaces of said second of said plugs which extend through said wires and between said row and column wires of the second matrix and the row and column wires of the first matrix, the first and the second plugs having a larger diameter on the side of the wire layers, each conductive surface of a plug comprising first and second contact surfaces which are electrically connected together, the angular positions of the first and second contact surfaces being shifted by 90° by said rotation of said plugs and the distance in the axial direction along the length of the surface of the plugs which is covered by said conductive surfaces being sufficient to bridge two adjacent layers when said surfaces are shifted.

2. The switch of claim 1 wherein the first and second contact surfaces have a generally "L" shape, the base of which corresponds to a 90° arc, and the height of which corresponds to the distance between the adjacent layers of wires which intersect at a crosspoint.

3. The switch of claim 1 or 2 wherein the first plugs have heads at the top of the switch and the second plugs have heads at the bottom of the switch, said first and second plugs being alternately oriented with respect to each other and to their places in said switch so that each plug with a head at the top is next to a plug with a head at the bottom, and operator means for engaging and rotating said heads of said plugs whereby said plug operator means may be made more compact.

4. The switch of claim 1 or claim 2 wherein each of said insulating frames has a plurality of spaced parallel grooves formed periodically therein, each of said wires being placed into corresponding grooves in said frame to form one of the layers of said wires.

5. The switch of claim 4 wherein said frame has first opposing grooves on the tops of two opposite sides and second opposing grooves on the bottoms of the other two opposite sides, the switch comprising a pile-up of a plurality of said frames alternately shifted by 90° with respect to the adjacent frame in said pile-up, the second grooves of an upper frame being placed next to the first grooves of the adjacent lower frame.

6. The switch of claim 4 and an edge contour formed along the inside edges of the sides of said frames to present a straight part and a projecting rounded part between two adjacent wires, said projecting rounded part providing a geometry which is substantially equal to the geometry of the plugs in the plane in which the plugs engage said wires; whereby the geometry of the wires is the same regardless of whether a wire extends between adjacent rows of plugs or between a row of plugs and the contoured side of the frame.

7. The switch of claim 1 wherein each of said plug means has a head comprising a lower part forming a cam with two arcuate surfaces of different diameters, joined by a pair of opposing abuttment face segments and a higher part forming a crank arm with a vertical engaging means, governing rod means shaped to bear against said engaging means, and means for operating said governing rod means to engage said crank arm means to rotate said cam between limits set by said abuttment face segments.

8. The switch of claim 7 wherein the heads of all of the plugs are arranged on a same side of the switch.

9. The switch of claim 7 wherein the length of said crank arms is greater than the length of a side of a square formed by intersecting ones of the spaced parallel wires, the larger of the two arcuate surface having a diameter which is slightly less than the length of said side of the square formed by the wires.

10. The switch of claim 7 wherein each of the governing rods has an active end which is flexible and has a vertical flexible finger which is engaged by said vertical engaging means for displacing said plug in rotary translation, means for causing said flexible finger to run in one direction or the other over an arcuate path extending toward and away from said plugs and wires, the high points of said arcuate path being at levels which are such that a lower end of the flexible finger is above the cranks while the low zone of said arcuate path is at a level which is such that the lower end of the flexible finger engages the engaging means of the crank arm.

11. The switch of claim 7 wherein said governing rod means slides through channels in a plate member positioned over said plugs.

12. The switch of claim 11 wherein a switching means comprises two parallel governing rod means.

13. The switch of claim 1 wherein said conductive surface of the plugs has a generally "S" shape, one conductive surface being constituted by the upper part of the "S" and the other conductive surface by the lower part of the "S", the intermediate part of the "S" being embedded in the body of the plug in order to electrically interconnect the upper and lower parts of the "S".

* * * * *